United States Patent [19]

Heinold et al.

[11] Patent Number: 4,946,023
[45] Date of Patent: Aug. 7, 1990

[54] APPARATUS FOR MANIPULATING GARMENT HANGERS

[75] Inventors: Hans Heinold, Dietzenbach; Joseph Rau, Heppenheim, both of Fed. Rep. of Germany

[73] Assignee: Manfred A. Jennewein, Mörfelden-Walldorf, Fed. Rep. of Germany

[21] Appl. No.: 360,402

[22] Filed: Jun. 2, 1989

[30] Foreign Application Priority Data

Jun. 4, 1988 [DE] Fed. Rep. of Germany ....... 3819102

[51] Int. Cl.$^5$ .............................................. B65G 47/26
[52] U.S. Cl. .................... 198/419.1; 198/431; 198/463.4; 198/464.3; 198/465.4; 414/397; 414/799
[58] Field of Search ............... 198/419.1, 431, 463.4, 198/464.3, 465.4, 485.1, 486.1; 414/389, 397, 799

[56] References Cited

U.S. PATENT DOCUMENTS

| | | | |
|---|---|---|---|
| 3,424,293 | 1/1969 | Deutschlander | 198/419.1 |
| 3,580,378 | 5/1971 | Pedersen | 198/465.4 |
| 3,613,911 | 10/1971 | Walchuter | 198/431 |
| 3,799,318 | 3/1974 | Dekoekkoek | 198/465.4 |
| 3,961,699 | 6/1976 | Hirsch | 198/465.4 |
| 4,276,995 | 7/1981 | Jennewein | 198/463.6 |
| 4,598,812 | 7/1986 | Grube et al. | 198/465.4 |

FOREIGN PATENT DOCUMENTS

| | | | |
|---|---|---|---|
| 1942434 | 3/1971 | Fed. Rep. of Germany . | |
| 2460102 | 2/1981 | France | 414/799 |
| 915029 | 1/1963 | United Kingdom | 198/465.4 |

*Primary Examiner*—Joseph E. Valenza
*Attorney, Agent, or Firm*—Peter K. Kontler

[57] ABSTRACT

Apparatus for transferring selected numbers of garment hangers from a downwardly sloping rail onto horizontal rod- or bar-shaped carriers of trolleys which are suspended on and advance along an overhead track has a singularizing device which is adjacent the discharge end of the rail and is operable to permit a selected number of hangers to advance onto the adjacent carrier while the respective trolley is pushed or pulled through a hanger receiving station. The trolleys are advanced by a chain conveyor the motor of which is started in response to signals from sensors denoting that the front end of the trolley has assumed a predetermined position with reference to the receiving station as well as that the conveyor for the trolleys assumes a predetermined position. Additional sensors are provided to detect the trailing ends of successive trolleys, to monitor the hangers upstream of the singularizing device and to generate signals in response to detection of hangers which have advanced beyond the singularizing device.

17 Claims, 3 Drawing Sheets

APPARATUS FOR MANIPULATING GARMENT HANGERS

BACKGROUND OF THE INVENTION

The invention relates to improvements in apparatus for manipulating garment hangers and analogous articles wherein a substantially hook-shaped portion can straddle a bar or a like carrier to maintain the article in suspended position. More particularly, the invention relates to apparatus for gathering garment hangers and analogous articles into groups of predetermined numbers of articles on trolleys or other types of conveyances.

Garment hangers are used in large numbers in garment manufacturing and cleaning plants for direct transport of jackets, shirts, blouses, coats, skirts, slacks and/or other articles of apparel. Apparatus for transporting garment hangers in such establishments normally employ chain conveyors, feed screws, sloping rails and so-called trolleys. A trolley includes a U-shaped body with a web in the form of an elongated carrier for hangers and two upwardly extending legs at the ends of the carrier. The upper end portions of the legs carry rollers which track a rail to ensure that the trolleys will advance along a predetermined path. In accordance with the presently prevailing practice, hangers are transferred onto the carriers of successive trolleys by hand. Such manual transfer of hangers is a tiresome and time-consuming operation, especially if the hangers carry bulky coats or other heavy garments. Moreover, the attendants must be careful to ensure that the carrier of each trolley will receive a predetermined number of hangers.

The manner in which hangers for garments can be transferred from a carrier is disclosed, for example, in German Offenlegungsschrift No. 1 942 434 of Klein. The carriers which are disclosed in this publication slope downwardly to ensure that rollers at the upper ends of garment hangers can advance toward the lower ends of the carriers under the action of gravity.

OBJECTS OF THE INVENTION

An object of the invention is to provide an apparatus which can automatically transfer empty or loaded garment hangers or analogous articles onto the carriers of successive trolleys or analogous conveyances.

Another object of the invention is to provide the apparatus with novel and improved means for automatically ensuring that each of a short or long series of carriers will receive a selected number of hangers or analogous articles.

A further object of the invention is to provide the apparatus with novel and improved means for transporting trolleys past the station where the carriers of such trolleys receive predetermined numbers of articles.

An additional object of the invention is to provide an apparatus which can receive predetermined numbers of articles from conventional article feeding means.

Still another object of the invention is to provide a novel and improved control unit for use in the above outlined apparatus.

A further object of the invention is to provide an apparatus which can be installed in existing hanger manipulating systems in garment making, garment cleaning and like plants.

Another object of the invention is to provide the control unit with safety features which ensure that each trolley of a long or short series of trolleys will receive a predetermined number of hangers.

SUMMARY OF THE INVENTION

The invention is embodied in an apparatus for manipulating discrete articles of the type having substantially hook-shaped carriers, particularly for manipulating hangers for garments. The improved apparatus comprises a series or file of conveyances each of which has an elongated carrier-supporting member (e.g., a straight bar or rod), an elongated track (e.g., an overhead rail) defining for the conveyances an elongated first path, article feeding means defining a second path with a discharge end adjacent the first path and serving to supply a series of articles toward and beyond the discharge end onto the supporting member of the conveyance which is adjacent the discharge end, singularizing means adjacent the second path and operable to release successive articles for advancement toward and beyond the discharge end, means for transporting successive conveyances of the aforementioned series or file of conveyances past the discharge end of the second path, and means for operating the singularizing means a predetermined number of times during transport of successive conveyances past the discharge end of the feeding means so that the supporting member of each conveyance receives a predetermined number of articles.

The transporting means comprises a conveyor (such as an endless belt or chain conveyor) for successive conveyances of the file and a prime mover (e.g., an electric motor) for the conveyor. The apparatus further comprises control means including a first sensor which is adjacent the first path and has means for generating first signals in response to detection of a conveyance in a predetermined portion of the first path, and means for starting the prime mover in response to first signals so that the conveyor transports the conveyance from the predetermined portion of the first path.

The first path preferably extends in the longitudinal direction of the supporting members, and the conveyor includes an advancing stretch or portion having a length which at least matches the length of the supporting member of a conveyance. The conveyor is provided with means (e.g., with one or more pairs of pin- or stud-shaped entraining elements) for entraining successive conveyances of the file past the discharge end of the second path, and the second path preferably slopes downwardly toward the predetermined portion of the first path so that the articles can advance into the range of the singularizing means by gravity feed. Analogously, the conveyances can advance into the range of the conveyor by gravity feed.

The control means preferably further includes means for arresting the prime mover with a delay following starting of the prime mover, and the operating means includes means for operating the singularizing means the predetermined number of times within an interval of time at most equaling the delay between starting and arresting of the prime mover.

The control means also comprises a second sensor which is adjacent the first path and has means for generating second signals in response to detection of selected portions of successive conveyances in the first path, and means for initiating the operation of the singularizing means by the operating means in response to second signals. The second sensor can be installed adjacent the discharge end of the second path.

Still further, the control means preferably includes a third sensor which is adjacent the first path and has means for generating third signals in response to detection of second portions of successive conveyances in the first path, and means for terminating the operation of the singularizing means by the operating means in response to such third signals. One of the second and third sensors is preferably located ahead of the other of these sensors, as seen in the direction of transport of conveyances along the first path.

The control means preferably also comprises a fourth sensor which is adjacent the second path and has means for generating fourth signals in response to detected absence of articles in the second path ahead of the singularizing means, and means for stopping the prime mover in response to fourth signals. In addition, the control means can include means for ending the operation of the singularizing means by the operating means in response to fourth signals.

The operating means preferably includes means for varying the predetermined number, and such varying means can include a presettable counter having an input which receives signals from a fifth sensor which applies to the input of the counter signals in response to advancement of discrete articles beyond the singularizing means.

As mentioned above, the transporting means can include an endless conveyor having at least one pair of entraining elements, and the elements of the at least one pair are spaced apart from each other a predetermined distance. The prime mover is arranged to drive the conveyor in a predetermined direction and a stretch of the conveyor is adjacent a portion of the first path. One element of the at least one pair of entraining elements serves to entrain a conveyance in the predetermined direction along the predetermined portion of the first path, and the control means preferably further comprises two additional (sixth and seventh) sensors which are adjacent the path of movement of the at least one pair of entraining elements with the endless conveyor and include means for generating additional (sixth and seventh) signals in response to a detection of the at least one pair of entraining elements. The control means further comprises means for activating the starting means in response to the sixth and seventh signals.

Each conveyance preferably comprises first and second holders for the ends of the respective supporting members (such holders can serve to suspend the respective supporting members on the track so that each conveyance can constitute a trolley which has rollers on the holders and can advance along the first path with a minimum of friction). The feeding means of such apparatus preferably further comprises means (e.g., one or more coil springs or leaf springs) for yieldably biasing the discharge end of the feeding means into the path of movement of the holders. The feeding means can be installed adjacent one side of the first path.

In accordance with a presently preferred embodiment, the control means can be constructed as follows: The aforementioned activating means for the prime mover includes a first AND gate having three inputs for reception of signals from the first, sixth and seventh sensors and an output serving to transmit signals in response to simultaneous reception of first, sixth and seventh signals, and a first flip-flop having a setting input for signals from the output of the first AND gate and an output which is connected with the starting means. The control circuit further comprises means for initiating the operation of the singularizing means by the operating means in response to signals from the second sensor, means for terminating the operation of the singularizing means by the operating means in response to signals from the third sensor, and means for arresting the prime mover in response to signals from the fourth sensor. The initiating, terminating and arresting means include a second flip-flop having a setting input for second signals, an output which is connected with a resetting input of the first flip-flop, a third flip-flop having a setting input for signals from the third sensor and an output connected with a resetting input of the second flip-flop and a resetting input connected with the output of the first flip-flop, and a second AND-gate having a first input connected with the output of the second flip-flop, a second input connected with the fourth sensor and an output, and a third AND gate having a first input connected with the output of the second AND gate, a second input connected with the output of a presettable counter, and an output connected with the operating means. The starting means includes an OR gate having a first input connected with the output of the first flip-flop, a second input connected with the output of the second AND gate, and an output connected with the prime mover.

The output of the means for varying the predetermined number (i.e., of the means including the presettable counter) is connected to the second input of the third AND gate.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
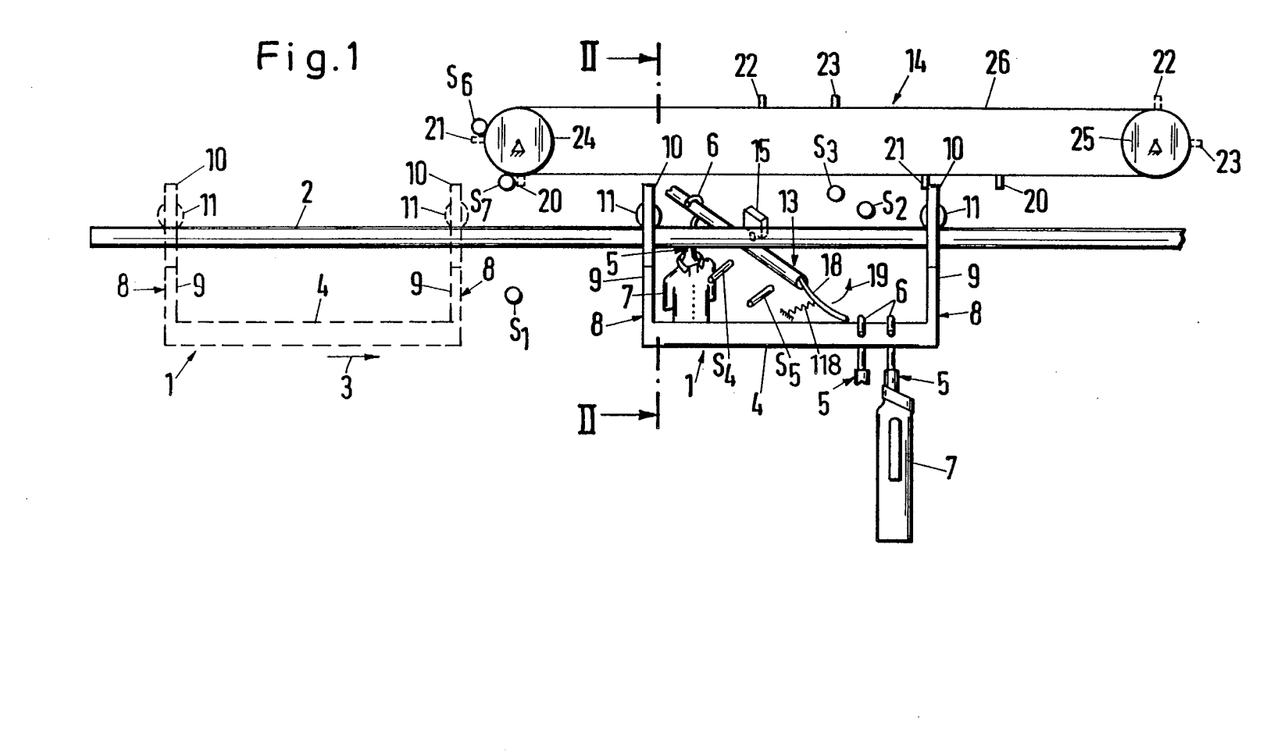
FIG. 1 is a schematic elevational view of an apparatus for transferring predetermined numbers of garment hangers onto successive trolleys of a file of trolleys, one of the trolleys being shown at the hanger-receiving station.
Figure 2:
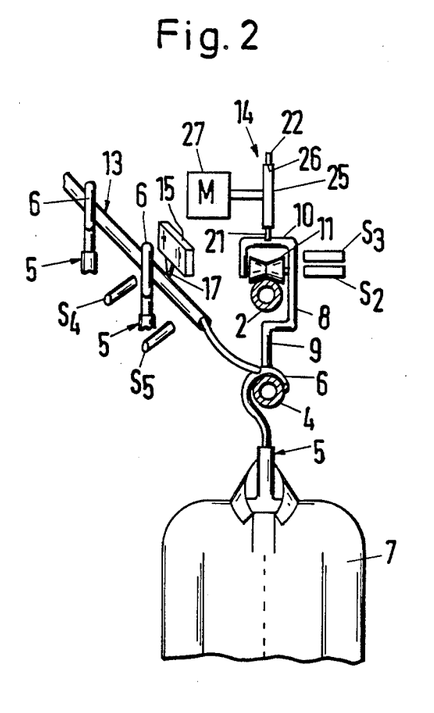
FIG. 2 is a sectional view substantially as seen in the direction of arrows from the line II—II of FIG. 1.

FIGS. 1 and 2 show an apparatus which serves to transfer predetermined numbers of articles in the form of garment hangers 5 from an article feeding means 13 onto elongated rod- or bar-shaped supporting members or carriers 4 forming part of a file of successive conveyances in the form of trolleys 1. The trolleys 1 are movable along an elongated track 2 which defines a first path, and the article feeding means 13 defines a second path which is located at one side of the first path and has a discharge end adjacent a portion of the first path at a receiving station where the carriers 4 of successive trolleys 1 receive predetermined numbers of hangers 5. The track 2 can include an endless rail having a portion which is located upstream and slopes downwardly toward the receiving station so that the trolleys 1 can reach such station under the action of gravity. Reference may be had to commonly owned U.S. Pat. No. 4,276,995 to Jennewein which shows an endless rail with an inclined section to ensure that the articles which are transported along such path can advance under the action of gravity. The direction of advancement of trolleys 1 is indicated by arrow 3. FIG. 1 shows (by solid lines) a first trolley 1 at the hanger receiving station and (by broken lines) a second trolley 1 of the file or series slightly upstream or ahead of the receiving station.

The carrier 4 of each trolley 1 constitutes the web of a U-shaped body which further includes a front holder or leg 8 and a rear holder or leg 8'. The legs 8 and 8' are rigidly connected to or integral with the respective ends of the carrier 4, and the latter is sufficiently long to provide room for a predetermined number of garment hangers 5 one behind the other. Each hanger 5 has a hook-shaped portion 6 which straddles the carrier 4 when the transfer of the respective hanger from the feeding means 13 onto the trolley 1 at the receiving station is completed. FIGS. 1 and 2 show that the hangers 5 are loaded, i.e., each hanger which is supplied by the feeding means 13 carries a garment in the form of a jacket or coat 7.

The track 2 of the illustrated apparatus is a hollow tube, the same as the carriers 4 of the trolleys 1. Each of the legs 8 and 8' comprises a vertical lower portion 9 which is affixed to the respective end of the carrier 4 and a hook-shaped upper portion 10 having a roller 11 which is guided by the track 2. The carriers 4 of successive trolleys 1 are parallel with the direction (arrow 3) of advancement of trolleys 1 along the track 2.

The feeding means 13 includes or constitutes an elongated rail which slopes downwardly toward the receiving station and receives successive hangers in a manner not forming part of the present invention. The apparatus of the present invention can be used in a garment making plant, in a garment cleaning plant or in any other establishment wherein large numbers of garment hangers are manipulated and groups consisting of predetermined numbers of hangers must be transferred onto the carriers of a series of trolleys or analogous conveyances. It is assumed that garment hangers 5 are placed onto the feeding means 13 by hand or are supplied thereto by a conventional feed screw, not shown. The discharge end of the path which is defined by the feeding means 13 (hereinafter called rail for short) is located substantially midway between the ends of the elongated lower reach or stretch of an endless belt or chain conveyor 26 forming part of a transporting unit 14 which serves to advance successive trolleys 1 past the discharge end of the second path to thus ensure predictable transfer of predetermined numbers of hangers 5 onto the carriers 4 of successive trolleys. The discharge end of the second path is located at a level slightly above the path of successive carriers 4, i.e., slightly below the first path which is defined by the track 2. The conveyor 26 is installed at a level above the track 2, and its lower reach or stretch is parallel or substantially parallel to the adjacent portion of the track.

Figure 3:
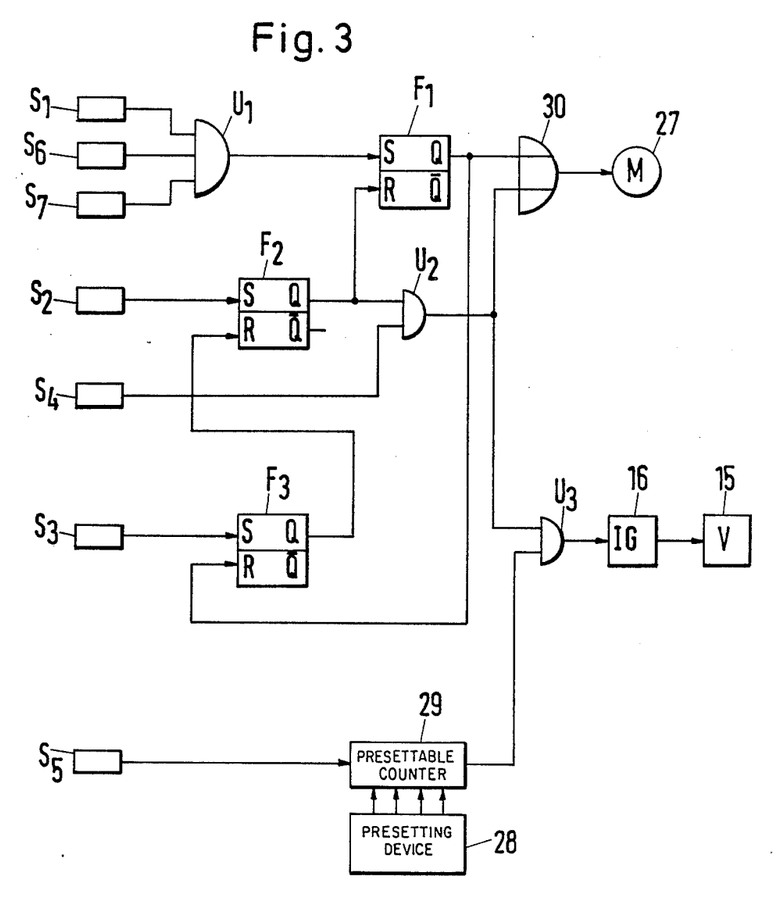
FIG. 3 is a block diagram of a control circuit for use in the apparatus of FIGS. 1 and 2.

The apparatus further comprises a hanger singularizing device 15 which is adjacent the second path and can be operated to ensure that the hangers 5 of a succession of such hangers on the rail 13 are singularized to reach the carrier 4 at the receiving station at certain intervals in synchronism with forward movement of the lower stretch of the conveyor 26. The means 16 for operating the singularizing device 15 is shown in FIG. 3. The illustrated singularizing device 15 comprises a stop 17 which normally extends into the second path to arrest the hook 6 of the foremost hanger 5. A signal from the operating means 16 suffices to retract the stop 17 for a short interval of time which suffices to permit a single hook 6 to slide by gravity past the singularizing device 15 on its way toward the receiving station. Singularizing devices which can be used in the apparatus of the present invention are disclosed, for example, in the aforementioned commonly owned U.S. Pat. No. 4,276,995 to Jennewein and in commonly owned copending U.S. patent application Ser. No. 301,511 filed Jan. 24, 1989 for "Apparatus for singularizing garment hangers."

The lower end portion 18 of the rail 13 can be deflected sideways by the front legs 8 of successive trolleys 1 against the opposition of a spring 118 (for example, a coil spring mounted at the outside or a torsion or leaf spring in the interior of the rail 2). The direction in which the end portion 18 can be deflected by an oncoming leg 8 is indicated by arrow 19. The end portion 18 can be made of a resilient material and then exhibits a tendency to enter the path of movement of successive front legs 8; this renders it possible to dispense with a discrete spring.

The length of that portion of the first path along which a trolley 1 can be advanced by the lower stretch of the conveyor 26 at least equals the length of a carrier 4. In the apparatus which is shown in FIG. 1, the length of the lower stretch of the conveyor 26 is approximately twice the length of a trolley 1. The conveyor 26 is provided with two pairs of entraining elements in the form of pins or studs 20, 21, 22 and 23. This conveyor is an endless chain which is trained over two sprocket wheels 24, 25 and is driven by a prime mover 27, e.g., a variable-speed electric motor shown in FIGS. 2 and 3 and arranged to transmit torque to the sprocket wheel 25. The distance of the first pair of pins 20, 21 from the second pair of pins 22, 23 (as seen in the direction of advancement of these pins along the endless path which is defined by the conveyor 26) equals or approximates the length of the lower stretch of the conveyor.

The control circuit of the improved apparatus comprises a first sensor S1 which is adjacent the track 2 upstream of the receiving station, i.e., ahead of the end portion 18 of the rail 13, and serves to generate first signals in response to detection of successive trolleys 1. A second sensor S2 of the control circuit is adjacent the track 2 slightly downstream of the end portion 18 of the rail 13. The distance of the second sensor S2 from the driven sprocket wheel 25 (i.e., from the downstream end of the lower stretch of the chain conveyor 26) equals or approximates the length of a trolley 1. The sensor S2 generates signals in response to detection of successive front legs 8 or any other portions of successive trolleys 1 in the regions of the front ends of the respective carriers 4. The purpose of signals which are generated by the sensor S2 is to interrupt (e.g., with a certain delay) the transmission of signals from the operating means 16 to the singularizing device 15 so that the trolley 1 which has caused the sensor 2 to generate a signal does not receive any additional hangers 5 after transmission of a signal from the sensor S2 to the operating means 16.

A third sensor S3 of the control circuit is installed slightly ahead of the sensor S2 in the region of the end portion 18 of the rail 13. Signals from the sensor S3 to the operating means 16 cause an interruption of transmission of signals from 16 to the singularizing device 15. The sensor S3 responds to detection of a second portion of each trolley 1, particularly in response to detection of the rear leg 8' or another part in the region of the rear leg.

A fourth sensor S4 is adjacent the second path upstream of the singularizing device 15 and generates signals denoting the presence and/or absence of hangers 5 on the rail 13. Signals from the sensor S4 are used to arrest the prime mover 27 for the conveyor 26 and to interrupt the transmission of signals from the operating means 16 to the singularizing device 15 in response to detected absence of hangers 5 upstream of the device 15. Such signals can interrupt the transmission of signals from the operating means 16 to the singularizing device 15 independently of signals from the sensor S2 and/or S3.

A fifth sensor S5 of the control circuit is adjacent the second path downstream of the singularizing device 15 and generates signals in response to detection of successive hangers 5, i.e., in response to detection of hangers which have advanced beyond the device 15 and are about to be transferred onto the carrier 4 at the receiving station. Signals from the sensor S5 are transmitted to a presettable counter 29 which is presettable by a device 28 serving as a means for varying the number of hangers 5 to be transferred onto successive carriers 4. When the counter 29 receives from the sensor S5 a predetermined number of signals (namely a number selected by the presetting device 28), the counter transmits to the operating means 16 a signal which results in deactivation of the singularizing device 15.

Two additional (sixth and seventh) sensors S6 and S7 are adjacent the path of movement of entraining pins 20–23 on the chain conveyor 26. The mutual spacing of sensors S6, S7 in the direction of advancement of entraining pins 20–23 equals the mutual spacing of pins 20, 21 of the first pair or the mutual spacing of pins 22, 23 of the second pair. As will be described in greater detail with reference to FIG. 3, the sensors S6 and S7 ensure that the signal from the first sensor S1 can be transmitted beyond a first AND gate A1 of the control circuit only when the first signal is generated simultaneously with the sixth and seventh signals, i.e., with signals from the sensors S6 and S7. Such situation arises when the sensors S6 and S7 respectively detect the presence of pins 20, 21 or 22, 23.

The sensors S1 to S7 are designed in such a way that they transmit signals for selected intervals of time, namely while the parts which are to initiate generation of the respective signals are within the range of the corresponding sensors. For example, each of the seven sensors S1 to S7 can be designed to generate a signal in response to detection of a metallic object (i.e., the sensor S1 will respond to detection of metal in a front leg 8, and so forth). However, it is equally possible to employ other types of sensors, for example, reflection type and other optoelectronic sensors, magnetically operated sensors or electric switches each of which is designed to open or to complete an electric circuit in response to actuation by the object which is to be monitored thereby.

FIG. 3 shows that the outputs of the sensors S1, S6 and S7 are connected to the respective inputs of the first AND gate U1, and that the output of the gate U1 is connected to the setting input S of a first flip-flop circuit F1 (hereinafter flip-flop). The output of the second sensor S2 is connected with the setting input S of a second flip-slop F2, and the output of the third sensor S3 is connected with the setting input S of a third flip-flop F3. The setting output Q of the first flip-flop F1 is connected with the resetting input R of the third flip-flop F3 and with one of the two inputs of an OR gate 30 which can be said to constitute a means for starting the motor 27 for the conveyor 26. The setting output Q of the second flip-flop F2 is connected with the resetting input R of the first flip-flop F1 and with one of the two inputs of a second AND gate U2. The output of the fourth sensor S4 is connected with the other input of the second AND gate U2. The setting output Q of the third flip-flop F3 is connected with the resetting input R of the second flip-flop F2. The output of the second AND gate U2 is connected with the other input of the OR gate 30 and with one of the two inputs of a third AND gate U3. The output of the AND gate U3 is connected with the input of the operating means 16 for the singularizing device 15. The other input of the AND gate U3 is connected with the output of the presettable counter 29. The output of the fifth sensor S5 is connected with the counting input of the presettable counter 29.

It is also within the purview of the invention to connect the third AND gate U3 between the operating means 16 and the singularizing device 15 and to connect the output of the second AND gate U2 directly with the input of the operating means 16. The output of the operating means 16 is then connected with one input of the AND gate U3 between 15 and 16, and the other input of this AND gate is then connected with the output of the presettable counter 29, the same as in the embodiment which is shown in FIG. 3.

The construction of the flip-flops F1 and F3 is such that their setting outputs Q transmit 0-signals and their resetting outputs $\overline{Q}$ transmit 1-signals in response to the application of operating voltage to the flip-flops. The setting outputs Q transmit 1-signals only when the respective setting inputs S receive 1-signals and the respective resetting inputs R receive 0-signals. The resetting outputs $\overline{Q}$ of the flip-flops transmit 1-signals when the respective resetting inputs R receive 1-signals and the respective setting inputs S receive 0-signals. The output signals of the flip-flops remain unchanged when the respective resetting inputs R receive 1-signals while the respective resetting outputs $\overline{Q}$ receive 1-signals and while the respective setting inputs S receive 1-signals simultaneously with transmission of 1-signals to the respective resetting inputs R.

The operating means 16 remains operative as long as its input receives 1-signals. The frequency at which the operating means 16 transmits signals to the singularizing device 15 is related to the speed of the conveyor 26 (i.e., to the speed of the motor 27) and to the maximum length of the trolleys 1 in such a way that the number of hangers 5 which are released by the singularizing device 15 for entry into the receiving station does not exceed the maximum number of hangers 5 which can be accommodated in a trolley 1. The length of the interval of time during which the operating means 16 transmits signals to the singularizing device 15 is shorter than the interval of time which elapses during transport of a trolley 1 past the end portion 18 of the rail 13.

The mode of operation of the improved apparatus is as follows:

The conveyor 26 is caused to assume a starting position wherein one pair of its entraining pins (for example, the pair including the pins 20 and 21) is detected by the sensors S6 and S7. Such positions of the pins 20 and 21 (adjacent the sensors S7 and S6, respectively) are shown in FIG. 1 by broken lines. The pins 22, 23 of the other pair of entraining pins then assume those positions which are shown in FIG. 1 by broken lines, namely adjacent the sprocket wheel 25. This is the starting position of the conveyor 26, and the sensors S6, S7 then transmit 1-signals to the respective inputs of the first AND gate U1. A trolley 1 is then caused to move onto the aforementioned downwardly sloping portion of the track 2, either by hand or by a suitable conveyor (not shown), so that the rollers 11 can roll along the track 2 and the trolley advances toward the receiving station. That portion of the track 2 which extends along the receiving station beneath the lower stretch of the conveyor 26 is or can be horizontal or nearly horizontal. The inertia of the arriving trolley 1 causes it to advance along such horizontal portion of the track 2 and the front leg 8 of the trolley is detected by the first sensor S1 which transmits a 1-signal to the respective input of the AND gate U1. FIG. 1 shows the foremost trolley 1 downstream of the sensor S1 and the next-following (broken-line) trolley 1 in a position in which its front leg 8 is about to reach the sensor S1. All three inputs of the AND-gate U1 receive 1-signals only when the sensors S6, S7 have detected the entraining pins 21, 20 or 23, 22 simultaneously with detection of the front leg 8 of a trolley 1 by the sensor 1. The output of the AND gate U1 then transmits a 1-signal to the setting input S of the first flip-flop F1. The setting output Q of the flip-flop F1 transmits a signal to the corresponding input of the OR gate 30 and to the resetting input R of the third flip-flop F3. The OR gate 30 starts the motor 27 so that the conveyor 26 is set in motion and causes the pin 21 to engage and entrain the upper portion 10 of the front leg 8 of the adjacent trolley 1. Such trolley then advances along the track 2 at the speed of the conveyor 26.

When the front leg 8 of the trolley 1 moves into the range of the sensor S3, the latter transmits a 1-signal but without setting the third flip-flop 3 because the resetting input R of the flip-flop F3 continues to receive a 1-signal from the setting output Q of the first flip-flop F1. When the front leg 8 of the trolley 1 then advances into the range of the second sensor S2, the signal at the output of the sensor S2 sets the second flip-flop F2 so that the first flip-flop F1, wherein the 1-signal has disappeared at the setting input S (because none of the sensors S1, S6 and S7 transmit a signal any longer), is reset and one input of the second AND gate U2 receives a 1-signal from the output Q of the second flip-flop F2. The fourth sensor S4 thereupon (or even before such time) transmits a 1-signal to denote the presence of a hanger 5 on the rail 13 ahead of the singularizing device 15, and the other input of the AND gate U2 also receives a signal so that the output of this gate transmits a signal which ensures that the motor 27 continues to drive the conveyor 26 and the adjacent trolley 1 in spite of simultaneous disappearance of the 1-signal at the setting input Q of the first flip-flop F1. The output of the second AND gate U2 also transmits a 1-signal to the corresponding input of the third AND gate U3; at the same time, the other input of the AND gate U3 receives a 1-signal from the output of the counter 29. The latter continues to transmit the 1-signal to the corresponding input of the gate U3 until it receives the predetermined number of signals from the sensor S5, namely a number of signals selected by the presetting device 28. Therefore, the operating means 16 is free to transmit signals to the singularizing device 15 which permits a hanger 5 to advance beyond the stop 17 in response to each signal from the operating means 16. Such hanger advances along the end portion 18 of the rail 13 and its hook 6 engages and remains on the adjacent portion of the carrier 4 which then advances in the direction of arrow 3 at a speed which is determined by conveyor 26. FIG. 1 shows the carrier 4 of the front trolley 1 in a position in which the carrier already supports two hangers 5 and has room for several additional hangers.

The sensor S5 transmits a signal to the counter 29 whenever a hanger 5 advances beyond the singularizing device 15, and the sensor S5 continues to transmit a 1-signal to the corresponding input of the third AND gate U3 until the total number of signals from the sensor S5 matches the number which was selected by the presetting device 28. When such number (e.g., five) is reached, the signal at the output of the counter 29 disappears, the same as the signal at the output of the third AND gate U3, and the operating means 16 ceases to transmit signals to the singularizing device 15. Such termination of transmission of signals from the gate U3 to the operating means 16 takes place before the rear leg 8' of the trolley 1 at the receiving station advances into the range of the sensor S3. The singularizing device 15 prevents additional hangers 5 from advancing onto and beyond the end portion 18 of the rail 13.

The operating means 16 is also prevented from operating the singularizing device 15 if the sensor S4 detects the absence of hangers 5 upstream of the singularizing device; this results in disappearance of the 1-signal at the output of the sensor S4 and in blocking of signal transmission by the AND gates U2 and U3. In other words, the gates U2 and U3 transmit 0-signals to arrest the singularizing device 15 as well as the motor 27.

When the rear leg 8' of a trolley 1 advances into the range of the sensor S3, the latter transmits a signal which sets the input S of the third flip-flop F3 because the first flip-flop F1 is already reset so that no 1-signal is applied to the resetting input R of the flip-flop F3. Therefore, the setting output Q of the flip-flop F3 transmits a 1-signal which is applied to the resetting input R of the second flip-flop F2, i.e., the flip-flop F2 is reset because, at such time, its setting input S receives an 0-signal from the second sensor S2. Therefore, the second flip-flop F2 transmits an 0-signal to arrest the motor 27 and to block the third AND gate U3 so that the operating means 16 cannot transmit signals to the singularizing device 15. The trolley 1 which has received a prescribed number of hangers 5 is free to advance in the direction of arrow 3 even though the motor 27 is arrested because the next-following (non-illustrated) portion of the track 2 preferably slopes downwardly so that the trolley advances by gravity. Alternatively, the entire illustrated portion of the track 2 can slope downwardly in the direction of arrow 3 and/or the next-following trolley 1 can push the freshly loaded trolley beyond the receiving station.

When the rear leg 8' of the loaded trolley 1 advances into the range of the sensor S2, this does not result in setting of the second flip-flop F2 and, therefore, the motor 27 and singularizing device 15 remain idle (the device 15 remains idle if, in accordance with a modification of the illustrated control circuit, the AND gate U3, the presetting device 28 and the counter 29 are omitted) because the resetting input R of the second flip-flop F2 continues to receive a 1-signal from the setting output Q of the third flip-flop F3. When the rear leg 8' advances beyond the range of the sensor S3 and the conveyor 26 comes to a halt, the entraining pins 22, 23 are in the range of the sensors S7 and S6 so that, when the next trolley 1 reaches the receiving station, the sensor S1 generates a signal and the output of the gate U1 transmits a signal to the setting input S of the first flip-flop F1 because each of the three inputs of the gate U1 then receives a signal (from the sensors S1, S6 and S7). The aforediscussed mode of operation is then repeated to ensure the transfer of a predetermined number of hangers 5 onto the carrier 4 of the trolley 1 at the receiving station.

The control circuit 3 of FIG. 3 can be modified in a number of additional ways without departing from the spirit of the invention. For example, the flip-flop F3 can be omitted and the signals at the outputs of the first AND gate U1 and second sensor S2 need not be applied directly to the flip-flops F1 and F2 but rather to two of three inputs of an OR gate. The third input of such OR gate is connected with the output of the third sensor S3. The output of the OR gate is transmitted to the counting input of a ring counter with, for example, five outputs. The first output of the ring counter is connected with the setting input S of the first flip-flop F1, the third output of the ring counter is connected with the setting input S of the second flip-flop F2, and the fourth output of the ring counter is connected with the resetting inputs R of the flip-flops F1 and F2. In other respects, the control circuit of FIG. 3 can remain unchanged. The just described modification is more complex than but is just as effective as the circuit of FIG. 3 and operates substantially in the same way.

The second sensor S2 can be omitted if the control circuit is provided with a clock or a like component which is started when the first sensor S1 generates a signal and continues to transmit a signal for an interval of time corresponding to that which normally elapses during transport of a trolley 1 past the receiving station. The signal from the timer is transmitted to the operating means 16 which transmits signals to the singularizing device 15 at a selected frequency within the aforementioned interval. However, the second sensor S2 exhibits the advantage that it enhances the versatility and flexibility of the control circuit because the latter can ensure proper transfer of selected numbers of hangers 5 onto the carriers 4 of successive trolleys 1 even if the trolleys are transported at different speeds and even if a trolley at the receiving station happens to come to a full halt.

It is also possible to omit the third sensor S3 if the control system is equipped with the aforementioned timer which ensures that the operating means 16 transmits to the singularizing device 15 signals during an interval which normally elapses from the instant when the sensor S1 detects the front leg 8' of an oncoming trolley 1 to the instant when the rear leg 8' of such trolley reaches the end portion 18 of the rail 13. The provision of a third sensor, which actually detects the trailing or rear leg 8' of a trolley 8, exhibits the advantage that the speed of the trolley 1 cannot influence the number of hangers 5 which are transferred onto its carrier 4 and that a trolley can come to a full stop at the receiving station without affecting the number of hangers which are transferred onto its carrier. Moreover, the sensor S3 ensures that no hanger 5 can be transferred onto a carrier 4 when the rear leg 8' of the respective trolley 1 reaches a predetermined position at a selected distance from the end portion 18 of the rail 13.

The sensor S4 also constitutes an optional but desirable and advantageous element of the control circuit. This sensor ensures that the motor 27 is arrested and that the operating means 16 ceases to transmit signals to the singularizing device 15 when the portion of the rail 13 immediately ahead of the singularizing device does not carry any hangers. Thus, signals from the sensor S4 can override signals from the sensors S2 and S3. An advantage of a control circuit which embodies the sensor S4 is that the trolley 1 at the receiving station comes to a halt if the feeding means including the rail 13 cannot deliver a selected number of hangers 5 within the interval of time which normally elapses during transport of a trolley past the receiving station. Moreover, the singularizing device 15 need not unnecessarily retract and extend its stop 17 when the second path portion immediately ahead of the stop 17 does not contain any hooks 6. If desired, the sensor S4 can be connected in the control circuit in such a way that it merely arrests the motor 27 or that it merely prevents the means 16 from operating the singularizing device 15 when the portion of the second path immediately upstream of the stop 17 does not contain any hooks.

The presettable counter 29 and the presetting device 28 for varying the number of signals which the sensor S5 must transmit before the counter deactivates the operating means 16 are standard components which are available on the market. The same holds true for the AND gates, the OR gate, the motor, the flip-flops and the operating means 16.

The sensor S5 can be omitted if the left-hand input of the counter 29 receives signals from the output of the operating means 16. However, the provision of sensor S5 enhances the reliability of the control circuit because this sensor is not affected by eventual failure of the singularizing device 15 and/or by eventual interlacing of articles (such as garments 7) which are carried by neighboring hangers 5.

The sensors S6 and S7 ensure that the conveyor 26 assumes a predetermined starting position when the sensor S1 detects the front leg 8 of a trolley 1 which advances toward the receiving station. Thus, the motor 27 can be started when the oncoming trolley 1 assumes a predetermined position with reference to the entraining pin 21 of one of the two pairs of entraining pins or relative to the entraining pin 23 of the other pair. This further ensures that each carrier 4 will invariably receive a selected number of hangers 5 as well as that the distribution of hangers on successive carriers will be the same.

The control circuit of FIG. 3 has been found to be particularly suitable for use in the improved apparatus because it ensures predictable transfer of selected numbers of hangers 5 onto successive carriers 4 irrespective of the selected speed of trolleys 1 and irrespective of the rate at which the rail 13 delivers hangers toward the singularizing device 15.

The provision of a rail 13 which has a deflectable end portion 18 normally extending all the way to or even slightly across the first path to ensure reliable delivery of successive hangers 5 all the way to the carrier 4 of the trolley 1 at the receiving station exhibits the advantage that such end portion can be automatically deflected by the oncoming legs 8 and 8' to thereupon immediately reassume its normal operative position, either due to its own resiliency or under the bias of one or more suitable springs.

An important advantage of the improved apparatus is that the number of hangers 5 which are to be transferred onto the carriers 4 of successive trolleys 1 can be selected at will, that such number can be readily altered by simply presetting the counter 29 by way of the presetting device 28, and that the number of hangers 5 on the carriers 4 of each of a short or long series of successively loaded trolleys 1 is the same. Furthermore, it is not necessary that the transfer of hangers 5 from the rail 13 onto the carriers 4 of successive trolleys 1 be monitored by one or more attendants. If the transfer of hangers 5 onto the rail 13 is carried out by hand, the person or persons in charge of such transfer need not observe the receiving station because each carrier 4 which arrives at this station automatically receives a preselected number of hangers, namely a number which can be readily accommodated on a carrier. The timing of transmission of signals from the operating means 16 to the singularizing device 15 can be readily synchronized with movements of the carriers 4 along the receiving station in such a way that hangers 5 are transferred onto a carrier 4 at optimum intervals to avoid overcrowding of the carriers. Moreover, the sensors of the control circuit ensure that the transfer of hangers is terminated in good time before the rear leg 8' of a trolley 1 reaches the end portion 18 of the rail 13.

The operating means 16 can be of the type known as IAE 2010-FBOA produced by IFM Electronic GmbH, Teichstr. 4, D-4300 Essen, Federal Republic Germany. The counter 29 and its varying means 28 can be of the type known as F-ZE-4 produced by Mitsubishi Electronic Europe GmbH, Brandenburgerstr. 40, D-4030 Ratingen 1, Federal Republic Germany.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for manipulating discrete articles of the type having substantially hook-shaped carriers, particularly for manipulating hangers for garments, comprising a file of conveyances each having an elongated carrier-supporting member; an elongated track defining for said conveyances an elongated first path; article feeding means defining a second path with a discharge end adjacent said first path and arranged to supply a series of articles toward and beyond said discharge end onto the supporting member of the conveyance which is adjacent said discharge end; singularizing means adjacent said second path and operable to release successive articles for advancement toward and beyond said discharge end; means for transporting successive conveyances of said file past the discharge end of said second path, including a conveyor for successive conveyances of said file and a prime mover for said conveyor; means for operating said singularizing means a predetermined number of times during transport of successive conveyances past said discharge end so that the supporting member of each conveyance receives a predetermined number of articles; control means including a sensor adjacent said first path and having means for generating signals in response to detection of a conveyance in a predetermined portion of said first path; and means for starting said prime mover in response to said signals so that said conveyor transports the conveyance from said predetermined portion of said first path.

2. The apparatus of claim 1, wherein said first path extends in the longitudinal direction of said supporting members and said conveyor includes an elongated advancing stretch having a length at least matching the length of the supporting member of a conveyance, said conveyor having means for entraining successive conveyances of said file past said discharge end and said second path sloping downwardly toward said predetermined portion of said first path.

3. The apparatus of claim 2, wherein said control means further includes means for arresting said prime mover with a delay following starting of said prime mover, said operating means including means for operating said singularizing means said predetermined number of times within an interval of time at most equaling the delay between starting and arresting of said prime mover.

4. The apparatus of claim 1, wherein said control means further comprises a second sensor adjacent said first path and having means for generating second signals on detection of selected portions of successive conveyances in said first path, and means for initiating the operation of said singularizing means by said operating means in response to said second signals.

5. The apparatus of claim 4, wherein said second sensor is adjacent said discharge end.

6. The apparatus of claim 4, wherein said control means further comprises a third sensor adjacent said first path and having means for generating third signals on detection of second portions of successive conveyances in said first path, and means terminating the operation of said singularizing means by said operating means in response to said third signals.

7. The apparatus of claim 6, wherein one of said second and third sensors is located ahead of the other of said second and third sensor in the direction of transport of successive conveyances along said first path.

8. The apparatus of claim 6, wherein said control means further comprises a fourth sensor adjacent said second path and having means for generating fourth signals in response to detected absence of articles in said second path ahead of said singularizing means, and means for stopping said prime mover in response to said fourth signals.

9. The apparatus of claim 8, wherein said control means further comprises means for ending the operation of said singularizing means by said operating means in response to said fourth signals.

10. The apparatus of claim 1, wherein said operating means includes means for varying said predetermined number.

11. The apparatus of claim 10, wherein said varying means includes a presettable counter.

12. Apparatus for manipulating discrete articles of the type having substantially hook-shaped carriers, particularly for manipulating hangers for garments, comprising a file of conveyances each having an elongated carrier-supporting member; an elongated track defining for said conveyances an elongated first path; article feeding means defining a second path with a discharge end adjacent said first path and arranged to supply a series of articles toward and beyond said discharge end onto the supporting member of the conveyance which is adjacent said discharge end; singularizing means adjacent said second path and operable to release successive articles for advancement toward and beyond said discharge end; means for transporting successive conveyances of said file past the discharge end of said second path; means for operating said singularizing means a predetermined number of times during transport of successive conveyances past said discharge end so that the supporting member of each conveyance receives a predetermined number of articles, said operating means including means for varying said predetermined number and said varying means including a presettable counter, said counter having and input; and control means including a sensor having means for applying to said input signals in response to advancement of discrete articles beyond said singularizing means.

13. Apparatus for manipulating discrete articles of the type having substantially hook-shaped carriers, particularly for manipulating hangers for garments, comprising a file of conveyances each having an elongated carrier-supporting member; an elongated track defining for said conveyances an elongated first path; article feeding means defining a second path with a discharge end adjacent said first path and arranged to supply a series of articles toward and beyond said discharge end onto the supporting member of the conveyance which is adjacent said discharge end; singularizing means adjacent said second path and operable to release successive articles for advancement toward and beyond said discharge end; means for transporting successive conveyances of said file past the discharge end of said second path, said transporting means comprising an endless conveyor having at least one pair of entraining elements, the elements of said pair being spaced apart from each other a predetermined distance and said transporting means further comprising a prime mover for driving said conveyor in a predetermined direction, said conveyor having a stretch adjacent a portion of said first path and one element of said at least one pair being arranged to entrain a conveyance in said direction along said portion of said first path; means for operating said singularizing means a predetermined number of times during transport of successive conveyances past said discharge end so that the supporting member of each conveyance receives a predetermined number of articles; and control means comprising a first sensor adjacent said first path and including means for generating first signals in response to detection of a conveyance in a predetermined portion of said first path, starting means activatable to start said prime mover means in response to said first signals, two additional sensors adjacent said conveyor and including means for generating additional signals in response to detection of said at least one pair of entraining elements, and means for activating said starting means in response to said additional signals.

14. The apparatus of claim 13, wherein said activating means includes a first AND gate arranged to transmit a signal in response to simultaneous reception of a first signal and additional signals from both said additional sensors, and a first flip-flop having a setting input for signals from said AND gate and an output connected with said starting means, said control means further comprising a second sensor adjacent said first path and having means for generating second signals on detection of selected portions of successive conveyances in said first path, means for initiating the operation of said singularizing means by said operating means in response to said second signals, a third sensor adjacent said first path and having means for generating third signals on detection of second portions of successive conveyances in said first path, means for terminating the operation of said singularizing means by said operating means in response to said third signals, a fourth sensor adjacent said second path and having means for generating fourth signals in response to detected absence of articles in said second path ahead of said singularizing means, and means for arresting said prime mover in response to said fourth signals, said initiating and terminating and arresting means including a second flip-flop having a setting input for said second signals, an output connected with a resetting input of said first flip-flop, a third flip-flop having a setting input for said third signals an output connected with a resetting input of said second flip-flop, and a resetting input connected with the output of said first flip-flop, and a second AND gate having a first input connected with the output of said second flip-flop, a second input for said fourth signals and an output, and a third AND gate having a first input connected with the output of said second gate and an output connected with said operating means, said starting means including an OR gate having a first input connected with the output of said first flip-flop, a second input connected with the output of said second AND gate, and an output connected with said prime mover.

15. The apparatus of claim 14, wherein said control means further comprises a fifth sensor having means for generating signals in response to advancement of discrete articles beyond said advancing means, and means for varying said predetermined number including a presettable counter having an input for said fifth signals and an output connected with a second input of said third AND gate.

16. Apparatus for manipulating discrete articles of the type having substantially hook-shaped carriers, particularly for manipulating hangers for garments, comprising a file of conveyances each having an elongated carrier-supporting member and first and second holders for the ends of the respective supporting member; and elongated track defining for said conveyances an elongated first path; article feeding means defining a second path with a discharge end adjacent said first path and arranged to supply a series of articles toward and beyond said discharge end onto the supporting member of the conveyance which is adjacent said discharge end, said feeding means comprising means for yieldably biasing said discharge end into the path of movement of said holders; singularizing means adjacent said second path and operable to release successive articles for advancement toward and beyond said discharge end; means for transporting successive conveyances of said file past the discharge end of said second path; and means for operating said singularizing means a predetermined number of times during transport of successive conveyances past said discharge end so that the supporting member of each conveyance receives a predetermined number of articles.

17. The apparatus of claim 16, wherein said feeding means is adjacent one side of said first path.

* * * * *